UNITED STATES PATENT OFFICE.

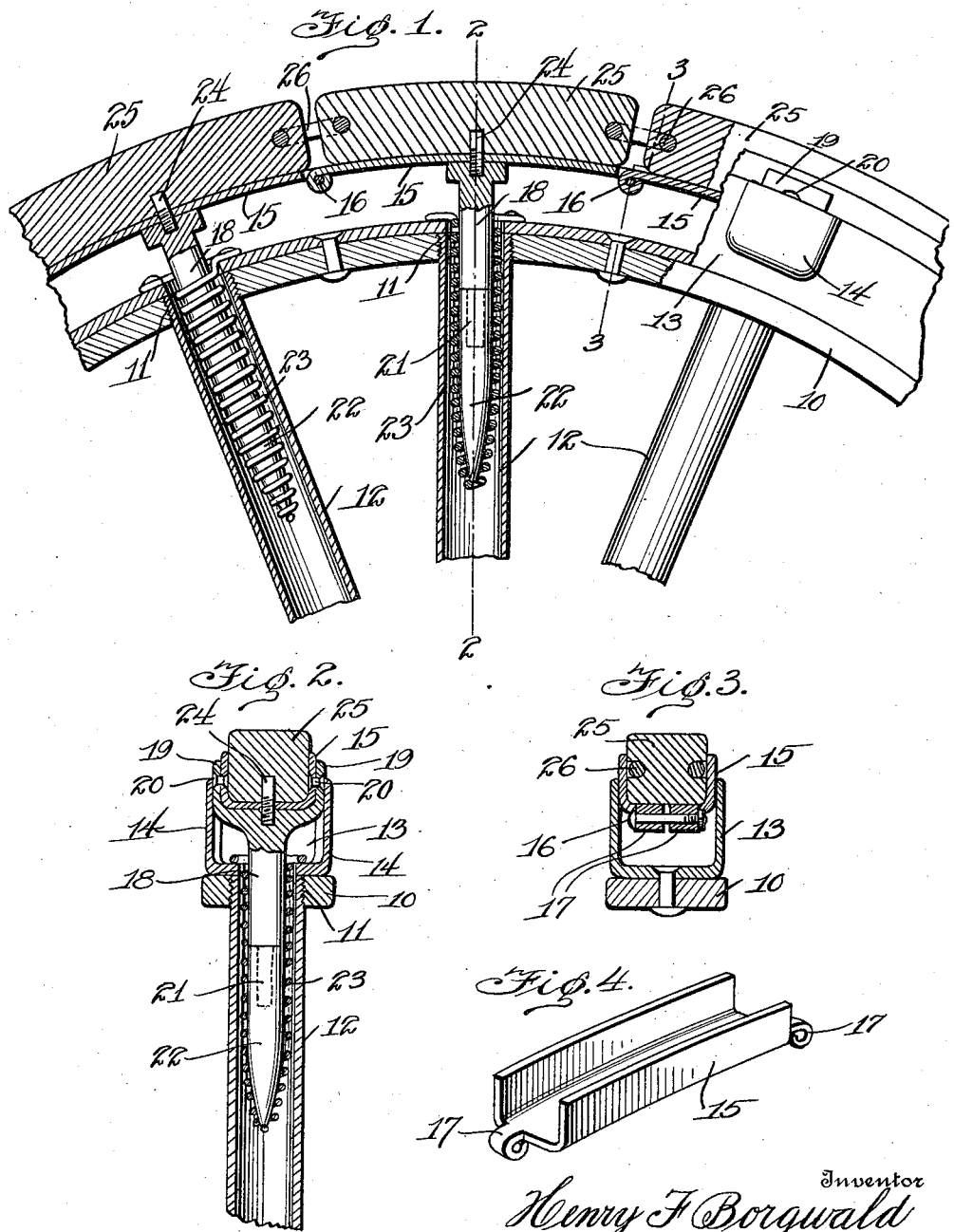

HENRY F. BORGWALD, OF CLEVELAND, OHIO.

WHEEL.

1,179,605. Specification of Letters Patent. Patented Apr. 18, 1916.

Application filed March 27, 1915. Serial No. 17,458.

*To all whom it may concern:*

Be it known that I, HENRY F. BORGWALD, citizen of the United States, residing at Cleveland, in the county of Cuyahoga and State of Ohio, have invented certain new and useful Improvements in Wheels, of which the following is a specification.

This invention relates to an improved wheel for automobiles and like vehicles and the principal object of the invention to provide a wheel which will have resiliency and thus do away with the necessity of an inflated tire.

Another object of the invention is to provide the wheel with an improved rim which is yieldably mounted thus giving the wheel its resiliency.

Another object of the invention is to provide improved springs for the yielding support of the rim and to also provide an improved type of tire carrying rim comprising a plurality of sections hingedly connected thus permitting the sections of the tire carrying rim to have independent movement.

Another object of the invention is to so construct this wheel that each of the sections of the tire carrying rim will be yieldably supported.

This invention is illustrated in the accompanying drawings, wherein:—

Figure 1 is fragmentary view of a wheel constructed in accordance with this invention and shown partly in section and partly in elevation. Fig. 2 is a vertical sectional view taken along the line 2—2 of Fig. 1. Fig. 3 is a sectional view taken along the line 3—3 of Fig. 1. Fig. 4 is a perspective view of one of the sections forming the tire carrying rim.

The wheel is provided with a felly 10 having threaded openings 11 formed therein to receive the outer end portion of the hollow spokes 12. This felly 10 carries the channel rim 13 provided throughout its circumference with enlargements forming pockets 14 the object of which will hereinafter be brought out. It should be noted that these pockets 14 extend from the walls of the channel rim in alinement with the spokes connected with the felly.

The tire carrying rim is composed of a plurality of sections or links 15 which are pivotally connected by the pins 16 extending through the hinged ears 17. These sections 15 are positioned as shown in Fig. 1 with one section positioned in alinement with each of the hollow spokes and provided with a strut 18, the arms 19 of which are secured to the section by means of the rivets 20. These struts 18 extend into the hollow spokes 12 and are provided with reduced end portions 21 which fit into the socket members 22 carried by the springs 23. These springs 23 are tapered as clearly shown in Fig. 1 so that the socket members will be securely held in place and at the same time yieldably supported thus giving resiliency to the tire carrying rim and permitting the automobile or other vehicle to ride easily. It should be noted that the sections 15 are additionally secured to the struts by the pins 24 and that the struts are prevented from having any tendency toward circumferential movement around the wheel by the arms 19 fitting into the pockets 14. Therefore the struts will be securely braced against movement about the wheel and since the sections of the tire carrying rim are securely fastened to the struts the tire carrying rim will also be prevented from having any circumferential movement. The tread blocks 25 which form the tire are provided with sockets into which the pins 24 pass to connect each block with its section 15 of the tire carrying rim. These blocks 25 are connected by the links 26 so that there will be provided a tire formed from a plurality of pivotally connected tread blocks.

I have therefore provided a wheel which will be very simple in construction but which is so constructed that it will be resilient and thus able to take up jars caused by going over rough roads. It should be noted that this wheel will be very strong and durable and not liable to break or get out of order and further that the wheel is so constructed that in case any part should break the sections of the tire and tire carrying rim can be disconnected and thus each of the struts independently removed and any necessary repairs made without it being necessary to entirely take the wheel apart. Therefore this wheel will be very convenient since it permits repairs to be quickly made without excessive labor or excessive loss of time.

What is claimed is:—

1. A resilient wheel comprising a felly provided with threaded openings, a channel rim carried by said felly and provided with openings registering with the openings in said rim and having its side walls provided with offsets forming pockets, hollow spokes having their outer end portions screwed into the threaded openings of said felly, spiral springs secured to said channel rim and extending through the openings thereof into said hollow spokes, socket members positioned in said spiral springs, struts carried by said socket members and having their outer end portions provided with arms positioned in the pockets of said channel rim, a tire carrying rim fitting within said channel rim and comprising a plurality of pivotally connected sections each fitting within the arms of one of said struts and secured thereto, tread blocks rigidly secured to the sections of said tire rim, and means pivotally connecting said tread blocks.

2. A resilient wheel comprising a felly provided with openings, a channel rim carried by said felly and provided with openings registering with the openings of said rim, hollow spokes having their outer end portions communicating with the openings of said felly, springs secured to said channel rim and extending through the openings thereof into said hollow spokes, socket members positioned in said springs, struts carried by said socket members and having their outer end portions provided wth arms, a tire carrying rim fitting within said channel rim and comprising a plurality of pivotally connected sections each fitting within the arms of one of said struts and secured thereto, and tread blocks rigidly secured to the sections of said tire rim.

3. A resilient wheel including a rim provided with openings, springs carried by said rim and extending through the openings thereof, sockets positioned within said springs, struts carried by said sockets and having their outer end portions provided with arms, and a tire carrying rim positioned about said first mentioned rim and comprising a plurality of sections fitting within the arms of one of said struts and secured thereto.

4. A wheel including a rim having openings formed therein, resilient supports carried by said rim, sockets carried by said resilient support, struts carried by said sockets, and a tire carrying rim positioned about said first mentioned rim and formed of a plurality of sections each connected with one of said struts.

In testimony whereof I affix my signature in presence of two witnesses.

HENRY F. BORGWALD.

Witnesses:
H. R. KROLL, Jr.,
E. W. WILHELMY.

Copies of this patent may be obtained for five cents each, by addressing the "Commissioner of Patents, Washington, D. C."